United States Patent
Dua et al.

(10) Patent No.: US 11,174,734 B2
(45) Date of Patent: Nov. 16, 2021

(54) LIFE EXTENSION OF POWER TURBINE DISKS EXPOSED TO IN-SERVICE CORROSION DAMAGE

(71) Applicant: Siemens Aktiengesellschaft, Munich (DE)

(72) Inventors: Dipankar Dua, Westerville, OH (US); Johnny Whiddon, Cypress, TX (US); Mohammad Reza Khajavi, Mount Vernon, OH (US); Jason Foley, Delaware, OH (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/622,346

(22) PCT Filed: Jun. 12, 2018

(86) PCT No.: PCT/US2018/037033
§ 371 (c)(1),
(2) Date: Dec. 13, 2019

(87) PCT Pub. No.: WO2018/236618
PCT Pub. Date: Dec. 27, 2018

(65) Prior Publication Data
US 2020/0200011 A1  Jun. 25, 2020

Related U.S. Application Data

(60) Provisional application No. 62/522,317, filed on Jun. 20, 2017.

(51) Int. Cl.
*F01D 5/00* (2006.01)
*B23P 6/00* (2006.01)
*G01N 25/72* (2006.01)

(52) U.S. Cl.
CPC .............. *F01D 5/005* (2013.01); *B23P 6/002* (2013.01); *G01N 25/72* (2013.01);
(Continued)

(58) Field of Classification Search
CPC ...... F01D 5/005; B23P 6/002; B23P 2700/06; G01N 25/72; F05D 2230/80;
(Continued)

(56) References Cited

U.S. PATENT DOCUMENTS

| 4,203,705 A | 5/1980 | Wesbecher |
| 5,080,734 A | 1/1992 | Krueger et al. |

(Continued)

FOREIGN PATENT DOCUMENTS

| CN | 1050744 A | 4/1991 |
| CN | 101908084 A | 12/2010 |

(Continued)

OTHER PUBLICATIONS

Dipankar Dua et al, "Life Prediction of Power Turbine Components for High Exhaust Back Pressure Applications: Part 1 —Disks ", Asme Turbo Expo 2015 Turbine Technical Conference and Exposition vol. 7A: Structures and Dynamics, Jun. 15, 2015, XP055508664, DOI: 10.1115/GT2015-43333, ISBN: 978-0-7918-5676-5, 8 pages.

(Continued)

*Primary Examiner* — Jason L Vaughan

(57) ABSTRACT

A repair method (72) for extending a service life of a power turbine disk (12) having corrosion damage, wherein the power turbine (14) includes stages (16, 18, 20, 22) and interstage gaps (26, 28, 30, 32). The method (72) includes conducting a first thermal analysis (74) of a baseline configuration of a baseline disk that does not have corrosion to determine a first steady state temperature distribution (44). A corrosion damaged disk (12) is then machined (76) to a depth suitable for repairing the corrosion to form a machined (Continued)

disk. A second thermal analysis (78) of the machined disk is conducted to determine a second steady state temperature distribution of the machined disk. A first predicted safe cyclic life (PSCL) (80) is then calculated for disk axisymmetric features (1-10) of the machined disk. A second PSCL (82) is also calculated for disk firtree features (70) of the machined disk. Further, the method (72) is qualified (84) to ensure that the quality of the machined disk is consistent with a new disk.

20 Claims, 8 Drawing Sheets

(52) U.S. Cl.
CPC ...... *B23P 2700/06* (2013.01); *F05D 2230/80* (2013.01); *F05D 2260/80* (2013.01)

(58) Field of Classification Search
CPC ........... F05D 2260/80; Y10T 29/49318; Y10T 29/49732; Y10T 29/49734
See application file for complete search history.

(56) References Cited

U.S. PATENT DOCUMENTS

| | | | |
|---|---|---|---|
| 5,490,195 A | 2/1996 | Berkley | |
| 6,354,799 B1 | 3/2002 | Mukira et al. | |
| 6,367,968 B1* | 4/2002 | Ringermacher | G01B 21/085 374/7 |
| 7,825,348 B2 | 11/2010 | Bouet et al. | |
| 8,810,644 B2* | 8/2014 | Bunker | F01D 25/285 348/86 |
| 8,810,664 B2* | 8/2014 | Sato | H04N 5/272 348/208.14 |
| 8,864,472 B2 | 10/2014 | Gignoux et al. | |
| 9,330,449 B2* | 5/2016 | Newman | G06T 7/0004 |
| 9,645,012 B2* | 5/2017 | Marsh | H04N 5/33 |
| 9,652,839 B2* | 5/2017 | Newman | H04N 5/33 |
| 10,443,509 B2* | 10/2019 | Kay | F01D 17/085 |
| 10,550,717 B2* | 2/2020 | Bewlay | G01N 25/72 |
| 10,738,616 B2* | 8/2020 | Lipkin | B23P 6/002 |
| 2004/0191064 A1 | 9/2004 | Guo | |
| 2007/0020135 A1 | 1/2007 | Jackson et al. | |
| 2009/0057275 A1* | 3/2009 | Chen | B23K 26/342 219/76.1 |
| 2009/0252987 A1* | 10/2009 | Greene, Jr. | G01N 29/041 428/678 |
| 2015/0204237 A1 | 7/2015 | Zemitis et al. | |
| 2016/0024925 A1 | 1/2016 | Stolz et al. | |
| 2017/0074107 A1 | 3/2017 | Neville et al. | |
| 2018/0027190 A1* | 1/2018 | Srinivasan | G01J 5/0014 348/164 |

FOREIGN PATENT DOCUMENTS

| | | |
|---|---|---|
| CN | 104791019 A | 7/2015 |
| EP | 1090711 A1 | 4/2001 |
| EP | 2030718 A1 | 3/2009 |
| JP | H09273978 A | 10/1997 |
| JP | H09304131 A | 11/1997 |
| JP | H10293049 A | 11/1998 |
| JP | 2001166819 A | 6/2001 |
| JP | 2007256042 A | 10/2007 |
| JP | 2017057851 A | 3/2017 |
| RU | 2417869 C2 | 5/2020 |
| RU | 2519707 C2 | 6/2020 |
| WO | 9531715 A1 | 11/1995 |

OTHER PUBLICATIONS

Claudio R. A. et al, "Fatigue life prediction and failure analysis of a gas turbine disc using the finite-element method", Fatigue & Fracture of Engineering Materials & Structures, pp. 849-860, XP055508692, PO Box 1354, 9600 Garsington Road, Oxford OX4 2XG, UK, DOI: 10.1111/j.1460-2695.2004.00810.x, Retrieved from the Internet: URL:http://citeseerx.ist.psu.edu/viewdoc/download?doi=10.1.1.503.7546&rep=repl&type=pdf, [retrieved on Sep. 21, 2018].
Shlyannikov V N et al, "Fracture analysis of turbine disks and computational-experimental background of the operational decisions", Engineering Failure Analysis—Papers Presented at the International Conference on Case Histories on Integrity and Failures in Industry (CHIFI) Oct. 2001 Elsevier Ltd GB, vol. 8, No. 5, pp. 461-475, XP002785055, DOI: 10.1016/S1350-6307(00)00041-8.
PCT International Search Report and Written Opinion dated Jan. 10, 2019 corresponding to PCT Application No. PCT/US2018/037033 filed Jun. 12, 2018.

* cited by examiner

Stage 1        Stage 2

LIFE EXTENSION OF POWER TURBINE DISKS EXPOSED TO IN-SERVICE CORROSION DAMAGE

PRIORITY CLAIM

This application claims the benefit under 35 U.S.C. § 119(e) of U.S. Provisional Application No. 62/522,317 filed on Jun. 20, 2017 and entitled DAMAGE REMOVAL AND LIFE EXTENSION OF POWER TURBINE DISKS THAT ARE EXPOSED TO IN-SERVICE CORROSION OR OTHER OPERATIONAL DAMAGE BY USING SKIM MACHINING, which is incorporated herein by reference in its entirety and to which this application claims the benefit of priority.

BACKGROUND

Technical Field

Aspects of the invention relate to a repair method for extending a service life of a power turbine disk having corrosion damage, and more particularly, to a repair method that includes conducting a first thermal analysis of a baseline configuration of a baseline disk that does not have corrosion to determine a first steady state temperature distribution, machining a corrosion damaged disk to a depth suitable for repairing the corrosion to form a machined disk, conducting a second thermal analysis of the machined disk to determine a second steady state temperature distribution of the machined disk, calculating a first predicted safe cyclic life (PSCL) for disk axisymmetric features of the machined disk, calculating a second PSCL for disk firtree features of the machined disk and qualifying the repair method to ensure that the quality of the machined disk is consistent with a new disk.

Description of Related Art

Aero derivative gas turbines utilizing power turbines are frequently used in oil & gas and power generation applications globally. Many of these units operate in offshore and marine environments wherein the inlet air and fuel often contain corrosive contaminants that can cause serious high temperature surface attacks and degradation of mechanical properties of critical power turbine components. The performance and durability of these power turbines largely depends on the capability of hot section components to resist high temperature surface attacks and to maintain their mechanical properties. The base material of the power turbine disks is typically either an iron-base or a nickel-base superalloy.

Over the past several years, several incidents of disk corrosion damage have been observed during power turbine overhauls especially for units fielded in a marine environment. A substantial portion of the corrosion damage has been observed at a region of a turbine disk that includes turbine blade attachment features (i.e. known as the disk firtree region), disk faces subjected to gases and torque transmission features. A mechanism for corrosion in these cases has been identified as Low Temperature Hot Corrosion (LTHC), also known as Type-II Hot Corrosion. Such corrosion can lead to significant degradation in alloy metal mechanical properties. It is desirable to repair power turbine disks exposed to corrosion and other operational damage in order to extend operational life of in-service disks without compromising safety and reliability of the equipment.

SUMMARY

A repair method is disclosed for extending a service life of a power turbine disk having corrosion damage, wherein the power turbine includes stages and interstage gaps. The method includes conducting a first thermal analysis of a baseline configuration of a baseline disk that does not have corrosion to determine a first steady state temperature distribution. The method also includes machining a corrosion damaged disk to a depth suitable for repairing the corrosion to form a machined disk, wherein the depth for machining the disks is established statistically. A second thermal analysis is then conducted of the machined disk to determine a second steady state temperature distribution of the machined disk. In addition, the method includes calculating a first predicted safe cyclic life (PSCL) for disk axisymmetric features of the machined disk and calculating a second PSCL for disk firtree features of the machined disk. Further, the repair method is qualified to ensure that the quality of the machined disk is consistent with a new disk, wherein qualifying the repair method includes machining trials, mechanical property and metallographic evaluations and residual stress evaluations.

Those skilled in the art may apply the respective features of the present invention jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures. The figures are not drawn to scale.

DETAILED DESCRIPTION

Figure 1:
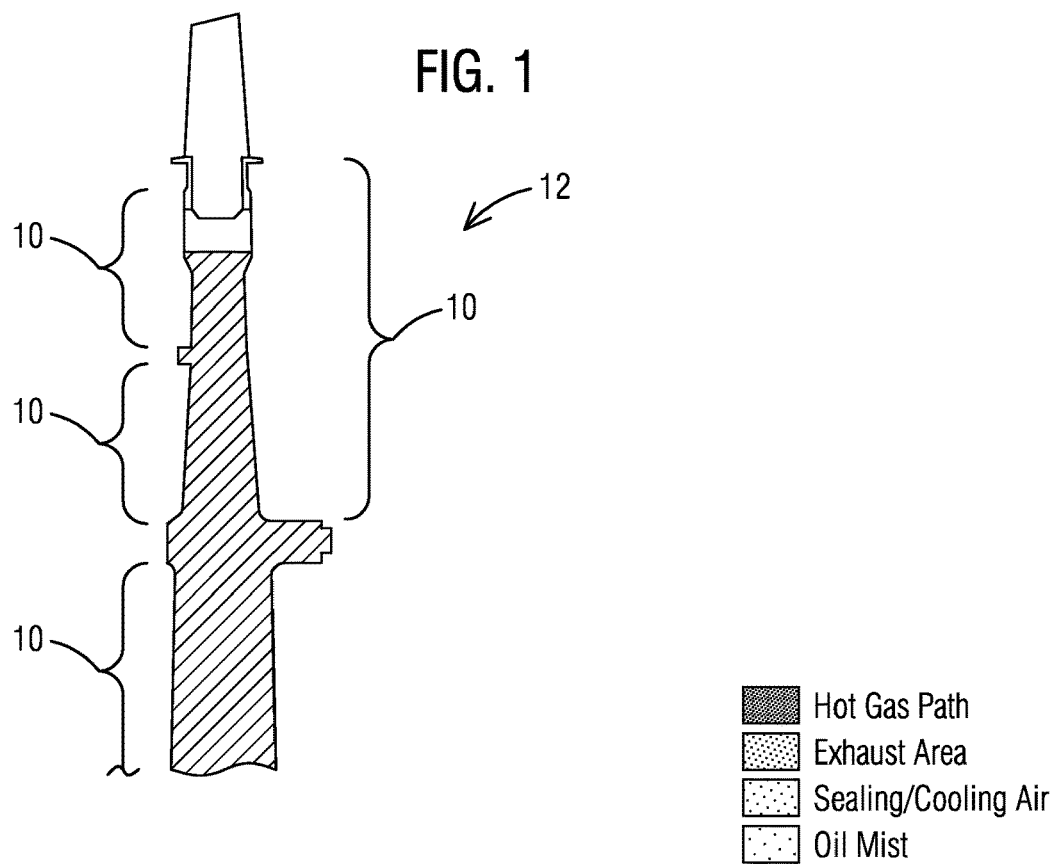
FIG. 1 depicts exemplary repair areas of a disk that may be machined or reworked in order to remove and/or repair corrosion indications.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

In accordance with aspects of the invention, a previously established disk repair method is used to machine a damaged disk to remove and/or repair the corrosion indications in order to extend the operational life of in-service disks as well as salvage previously discarded disks via skim machining. FIG. 1 depicts exemplary repair areas 10 of a disk 12 that may be machined or reworked in order to remove and/or repair corrosion indications. In particular, the repair areas 10 may include rim, web and bore areas of a disk (see FIG. 3). In the repair method, a proposed depth for machining the disks is established statistically by studying observed depth of the subsurface damage induced by Low Temperature Hot Corrosion (LTHC), also known as Type-II Hot Corrosion induced corrosion, damage on previous power turbine disks, depth of machining induced damage observed in the disks due to tool slip up or general mishandling and the surface grain size of the production disks. In addition, the repair method includes a combination and/or sequence of analytical assessments, comprehensive machining trials performed to isolate the effect of repair process variables, extensive characterization of the trial disks via residual stress evaluation studies and mechanical testing of specimens extracted from the disks after repair. Further, process controls are used to ensure that the quality levels of a repaired disk are substantially consistent with new finished machined disks.

Life Prediction and Impact Evaluation

In accordance with an aspect of the invention, a life prediction methodology is utilized for evaluation of the impact of repairs on the power turbine disk. In this regard, the disclosure of "Life Prediction of Power Turbine Components for High Exhaust Back Pressure Applications—Part I: Disks" by Dua, D. and Vasantharao, B., Proceedings of 2015 ASME Turbo Expo, Turbine Technical Conference and Exposition 2015, GT2015-43333, pp. V07AT28A012 is hereby incorporated by reference in its entirety (i.e. "Life Prediction document"). In accordance with the life prediction methodology, a predicted safe cyclic life (PSCL) of a disk feature is $\frac{2}{3}^{rd}$ (i.e. a calculated value as a factor of safety on the design) of the minimum life to burst (i.e. after unstable crack growth, the point at which a part of a component breaks loose as contained or uncontained debris). A minimum life to burst is equal to the sum of a minimum initiation life and a minimum propagation life at the feature. In the following, an effective strain parameter based method is used to predict a typical initiation life and a reserve factor is applied to estimate the minimum initiation life. A fracture mechanics-based approach is used to predict a typical propagation life and a reserve factor is applied to estimate the minimum propagation life. Further, propagation life is computed only for those disk features that had a predicted initiation life less than a targeted PSCL.

In particular, isothermal and strain controlled smooth specimen low cycle fatigue (LCF) data is used to create Walker strain vs. initiation life curves with consideration to the following component-to-specimen differences: a) volume of high stressed material b) R-ratio correction c) surface condition and method of manufacture and d) temperature at highest stress. The ratio of $\sigma_{min}/\sigma_{max}$, where $\sigma_{min}$ is a minimum tensile transient stress component and $\sigma_{max}$ is a maximum tensile transient stress component, is known as a stress ratio R. A known expression used to define a Walker strain parameter is shown in Equation $$\varepsilon_w = \frac{\sigma_{vm-max}}{E}\left(\frac{\Delta\varepsilon E}{\sigma_{vm-max}}\right)^w \qquad \text{Eqn. (1)}$$

where "$\varepsilon_w$" is an effective strain parameter, "$\sigma_{vm-max}$" is the maximum Von-Mises stress value in the cycle, "$\Delta\varepsilon$" is the largest strain range in any fixed direction through the loading cycle, "E" is Young's modulus of elasticity at the temperature of the time point in the cycle corresponding to the maximum Von-Mises stress and "w" is the Walker exponent that is used to correlate test results at different minimum to maximum stress ratios (R). Although the strain controlled testing of the smooth specimens was done at an R-ratio of −1, it is also known from the stress analysis of the power turbine disks that the R-ratio (min stress/max stress) at each feature is different. A value of the Walker exponent "w" was chosen such that the final Walker strain parameter computed becomes independent of the R-ratio value.

A least squares fit is performed on the Walker strain vs. initiation life from the specimen data to determine fitting parameters "$N_o$", "$U_N$", and "A" (see Equation (2)) for the disk materials:

$$N_f = N_o\left\{\frac{\varepsilon_w + U_N}{\varepsilon_w - U_N}\right\}^{\frac{1}{2A}} \qquad \text{Eqn. (2)}$$

where "$\varepsilon_w$" is an effective strain parameter and "$N_f$" is crack initiation LCF life.

A stress analysis of the component provides the strain range and maximum Von-Mises stress required for the calculation of the Walker strain. This value is corrected for an area correction factor ($K_A$) to take into consideration that the area and/or volume of highly stressed material in a component is different to that in a specimen. A surface condition knock down factor ($K_S$) is also applied to take into consideration that the specimen surface is ground and polished whereas the component surface is machined only. Thus, for the component, the Walker strain is calculated using the Equation (3) below:

$$\varepsilon_w = \left[\frac{\sigma_{vm-max}}{E}\left(\frac{\Delta \varepsilon E}{\sigma_{vm-max}}\right)^w\right] \times K_A \times K_S \qquad \text{Eqn. (3)}$$

$$\text{where } K_A = \left(\frac{S_b}{S_o}\right)^{\frac{1}{\beta}}$$

and wherein "$S_o$" and "$S_b$" are areas defined on the specimen and the component that contain Walker strains representative of the peak strain. In particular, "$S_o$" is a reference surface area of the strain controlled test specimen, "$S_b$" is a surface area for the particular feature on the component and "$\beta$" is a shape parameter.

The Walker strain calculated for the component feature using Equation (3) is used to predict the initiation life of that feature from the curve fits done on the specimen data using Equation (2). Even for the disk features such as notches, fillets, or turned features with a higher "$K_t$" value (i.e. stress concentration factor), smooth specimen strain controlled data is used for life declaration. This is considered by the inventors herein as a conservative and valid approach.

The propagation life was estimated using commercially available fatigue crack growth prediction software. Such software frequently includes planar code. Planar codes frequently assume that an analyzed geometry can be represented by a rectangular plate, the component is load controlled (e.g. constant loading at the remote boundaries), there is no significant load redistribution (remote loading does not change as crack grows), and the crack remains planar. Stress intensity factor (SIF) solutions in a planar tool assume linear elastic fracture mechanics (LEFM) applies.

A known Paris-Erdogan equation as shown in Equation (4) defines the crack growth rate as a function of stress intensity and is used for estimating propagation life. The coefficients required to define the Paris equation (C and n) are obtained from crack growth tests:

$$\frac{da}{dN} = C(\Delta K)^n \qquad \text{Eqn. (4)}$$

where "a" is a crack length and "da/dN" is a crack growth rate. A critical crack size that a disk feature can sustain depends on a known fracture toughness ($K_{IC}$) of the disk material at the temperature of interest.

Propagation life is estimated by integrating the crack-growth model shown in Equation (5). The right hand side of Equation (4) includes the stress intensity term "$\Delta K$". "$\Delta K$" is a function of the geometry, crack dimension, orientation and stresses at the feature in consideration as shown in Equation (5) below:

$$\Delta K = \Delta \sigma f(\text{geometry}, \text{crack dim}) \qquad \text{Eqn. (5)}$$

Since a change in stress intensity at a crack tip is a function of the change in stresses ($\Delta \sigma$) and geometry, orientation and dimension of the crack in the disk feature, a value of "$\Delta K$" was estimated by defining a "maximum stress field", a "minimum stress field" and the dimensions of the assumed plane of crack propagation.

For the estimates of propagation life, the effects of minimum compressive stress field were neglected, i.e.:

$$\Delta \sigma = \sigma_{max} - \sigma_{min} = \sigma_{max} - 0 = \sigma_{max} \qquad \text{Eqn. (6)}.$$

For disk features that have the minimum stress field as tensile, an equivalent 0-max stress field was produced by Walker correction as listed in Equation (7):

$$\Delta K_{eff} = 1-R)^{(m-1)}\Delta K \qquad \text{Eqn. (7)}$$

wherein "$\Delta K_{eff}$" is the modified effective stress intensity factor, "R" is the ratio of minimum ($\sigma_{min}$) and maximum ($\sigma_{max}$) stress field and "m" is the Walker exponent.

At a feature of interest, a time plot of the max principal stress was used to identify the point that is subjected to maximum tensile stress. The crack orientation at this point is then identified and a plane of propagation defined. A section is defined along this orientation and the worst principal stresses plotted on this section at the peak stress time point. A polynomial fit of stress vs. distance data points along the shallowest stress gradient on the section previously defined to obtain the maximum stress field. The crack-growth model used for estimating propagation lives includes two coefficients C and n. If the peak cycle temperature at the disk feature in consideration is not the same as the temperature at the peak stress time point, then the expressions in Equations (8A) and 8(B) are used to determine the coefficients while accounting for the differences in temperature:

$$C_p = \sqrt{C_{max \cdot strstemp} C_{max \cdot temp}} \qquad \text{Eqn. (8A)}$$

$$n_p = (n_{max \cdot strs\ temp} + n_{max\ temp})/2 \qquad \text{Eqn. (8B)}.$$

Creep damage to the disks is then estimated. With regard to creep damage estimation, the disclosure of "A New Hyperbolic Tangent Modelling Approach For The Creep Behaviour of The Single Crystal Nickel-Based Superalloy CMSX-4" by Basoalto, H. Vermeulen, B., Brooks, J. W. Coventry, G. Williams, S. Mason-Flucke, J. Bagnall, S. (2018), in TMS Superalloys pgs. 515-520 is incorporated herein by reference in its entirety. The relationship between the applied stress σ and the accumulated strain ε at a given time and temperature can be expressed using:

$$\sigma = \sigma_i\left(1 + \tanh\left(k \cdot \log\left(\frac{\varepsilon}{\varepsilon_i}\right)\right)\right) \qquad \text{Eqn. (9)}$$

wherein "$\sigma_i$" and "$\varepsilon_i$" are functions of temperature and time. The "$\sigma_i$" parameter is one half of ultimate tensile strength, "$\varepsilon_i$" is the strain at the point of minimum strain rate when the applied stress equals "$\sigma_i$" and "k" is a fitting parameter. Disk features are assessed for a level of accumulated equivalent inelastic creep strain at the end of operating life and compared against an acceptable creep induced deformation limit based on prior experience of having fielded units in similar operating conditions.

Figure 2:
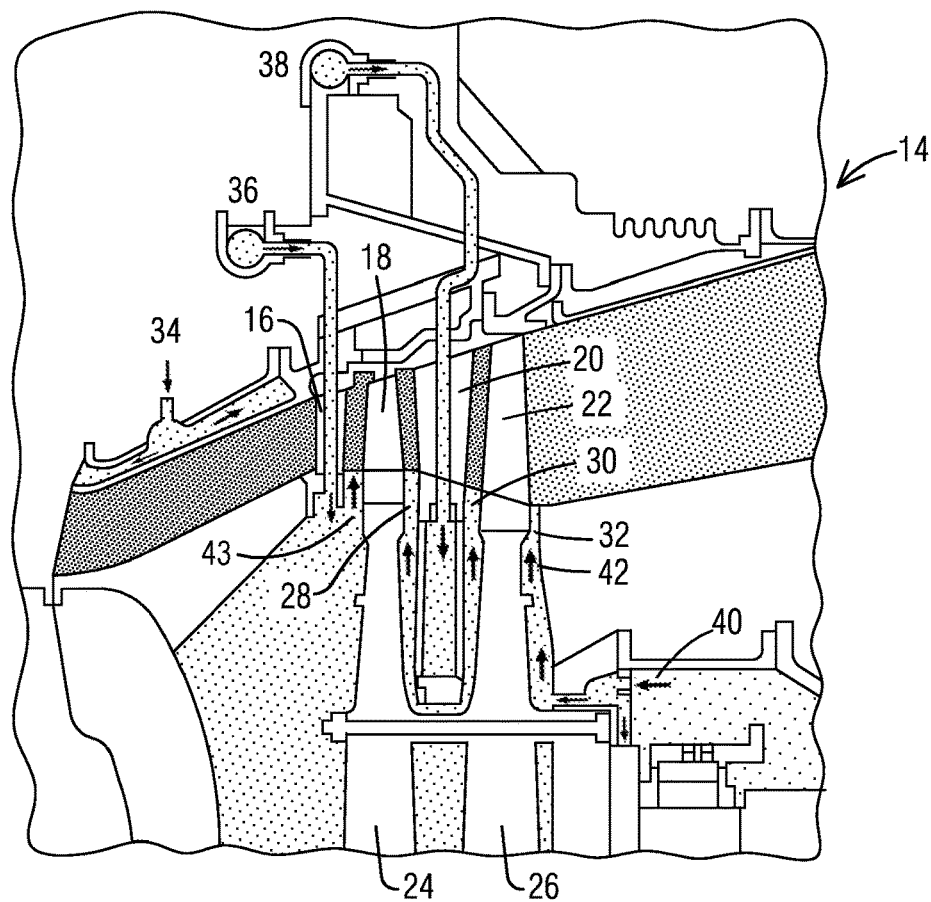
FIG. 2 is a partial cross-sectional view of a known power turbine and depicts a known secondary air scheme.

Referring to FIG. 2, a partial cross-sectional view of a known power turbine 14 having a first vane 16, first blade 18, second vane 20 and second blade 22 are shown. The first 18 and second 22 blades are attached to first 24 and second 26 rotating disks, respectively. The first vane 16 and first blade 18 form a first stage and the second vane 20 and second 22 blade form a second stage. The first vane 16, first blade 18, second vane 20 and second 22 blade also form first 43, second 28, third 30 and fourth 32 interstage gap openings.

Locations 34, 36, 38 and 40 in FIG. 2 identify ports from which cooling air is supplied to the power turbine 14 as part of a known secondary air scheme. The air is drawn from compressor stages to provide cooling air to the disks 24, 26 to optimize disk life. Arrows 42 depict a flow path for a secondary air scheme for the power turbine 14. The air also provides ventilation and the sealing of cavities to eliminate or minimize hot gas ingestion and prevent an oil mist from igniting.

The machining of the disks 24, 26 to remove disk material and repair the corrosion damage affects hot gas ingestion and cavity leakage flow characteristics. In particular, steady state and transient temperature fields in the disks 24, 26 are substantially dependent on the secondary air flows and cavity dynamics, thus directly affecting the PSCL and overall creep damage. Hence, it is important to accurately predict the changes to the secondary air flow characteristics to quantify an impact to the mechanical integrity and life of the disks post repair.

Figure 3:
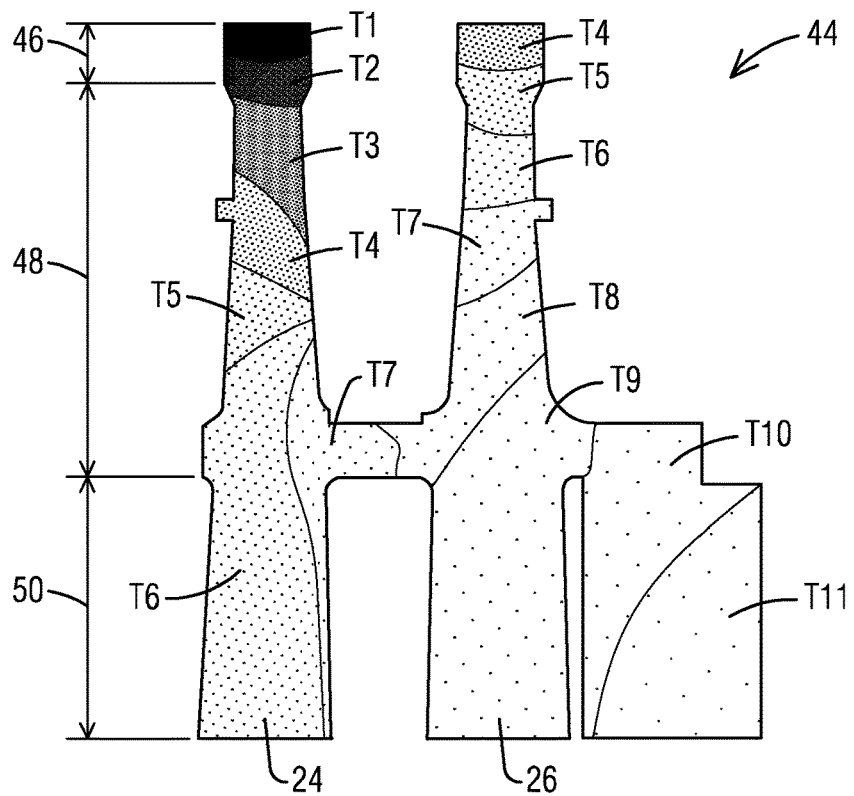
FIG. 3 depicts an exemplary steady state temperature distribution for disks of the power turbine.
Figure 4:
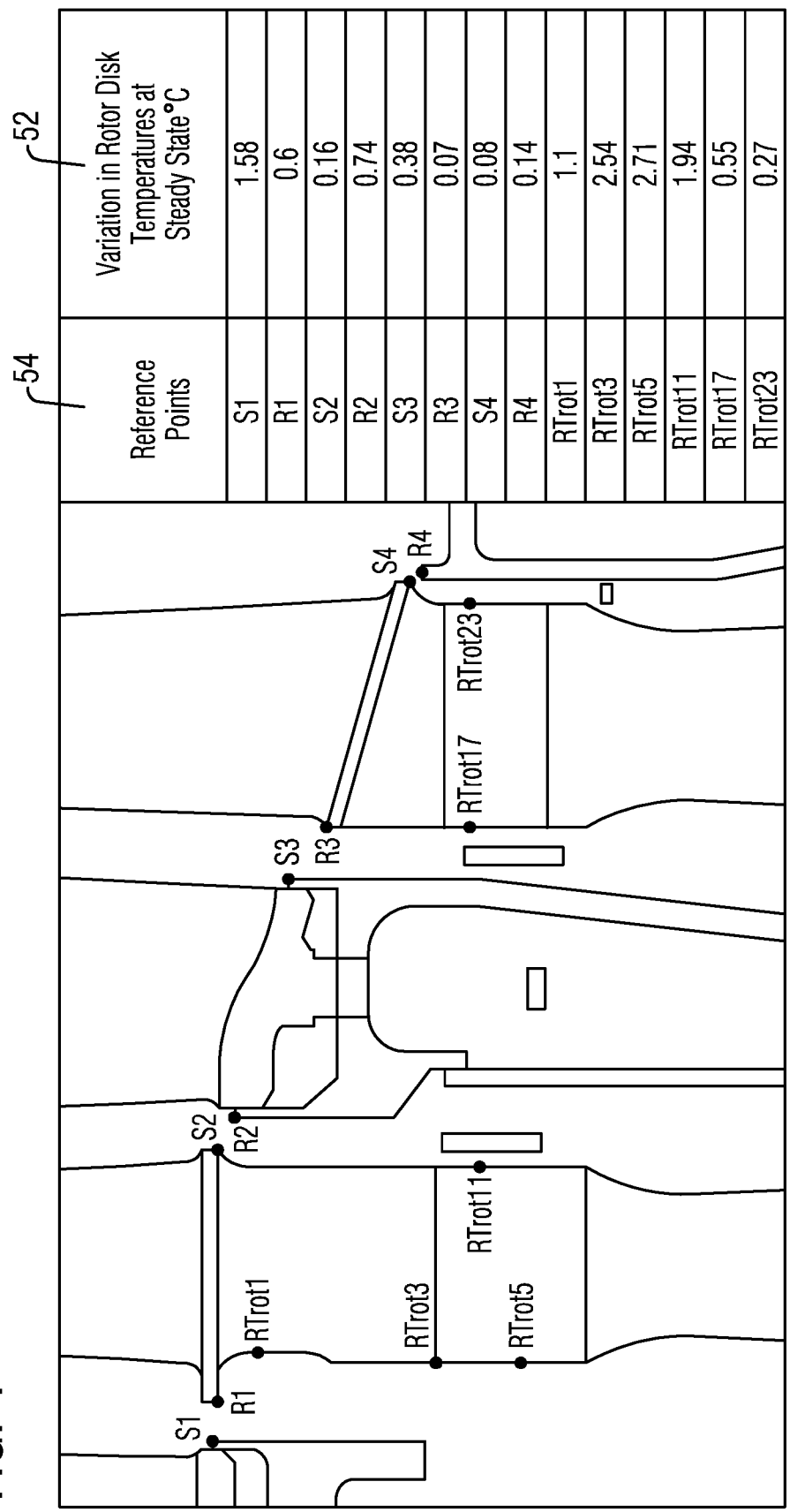
FIG. 4 illustrates the steady state temperature variation in rotor disk temperatures between a baseline configuration and worst case gaps.

In accordance with an aspect of the invention, a thermal model is generated of a baseline power turbine configuration. Referring to FIG. 3, an exemplary steady state temperature distribution 44 for disks 24, 26 of the power turbine 14 is shown wherein $T_1$-$T_{11}$ refers to temperatures for associated regions of the disks. $T_1$ denotes the highest temperature and $T_2$-$T_{11}$ denote progressively decreasing temperatures. For purposes of illustration, the steady state temperature distribution 44 is depicted relative to rim 46, web 48 and bore 50 sections of the disks 24, 26. During the design development phase of the power turbine 14, system level power turbine secondary flow analyses were performed for multiple interstage gap opening 43, 28, 30, 32 combinations. The effect of changes in entrainment flow as well as reduction in cooling flow were evaluated. FIG. 4 shows the steady state temperature variation in rotor disk temperatures 52 between the baseline configuration and worst case gaps. In particular, the reference points 54 for rim temperature comparisons are shown in FIG. 4. A sensitivity study shows that the impact to the steady state disk temperatures due to an increased gap opening is approximately 3 degrees C. This temperature change is considered by the inventors herein to be very low risk to overall power turbine disk life. Thus, it is considered that the overall effect to disk rim temperatures due to changes in secondary air system characteristics, because of disk repair, is negligible.

A turbine blade includes an airfoil section and a root section. The root section includes a plurality of outwardly extending serrations or lobes that decrease in size along a lower portion of the root section to form a multi-lobed configuration known as a firtree. A corresponding turbine rotor disk includes a plurality of attachment slots spaced apart one from another. Each disk slot includes a series of axial recesses or notches defined in opposite side walls of each slot which substantially conform in both shape and direction to the firtree of the root section so as to form a corresponding disk firtree configuration. The disk firtree provides corresponding slots that retain the root section in order to retain the blade under the high temperature, high stress environment of a power turbine.

Figure 5:
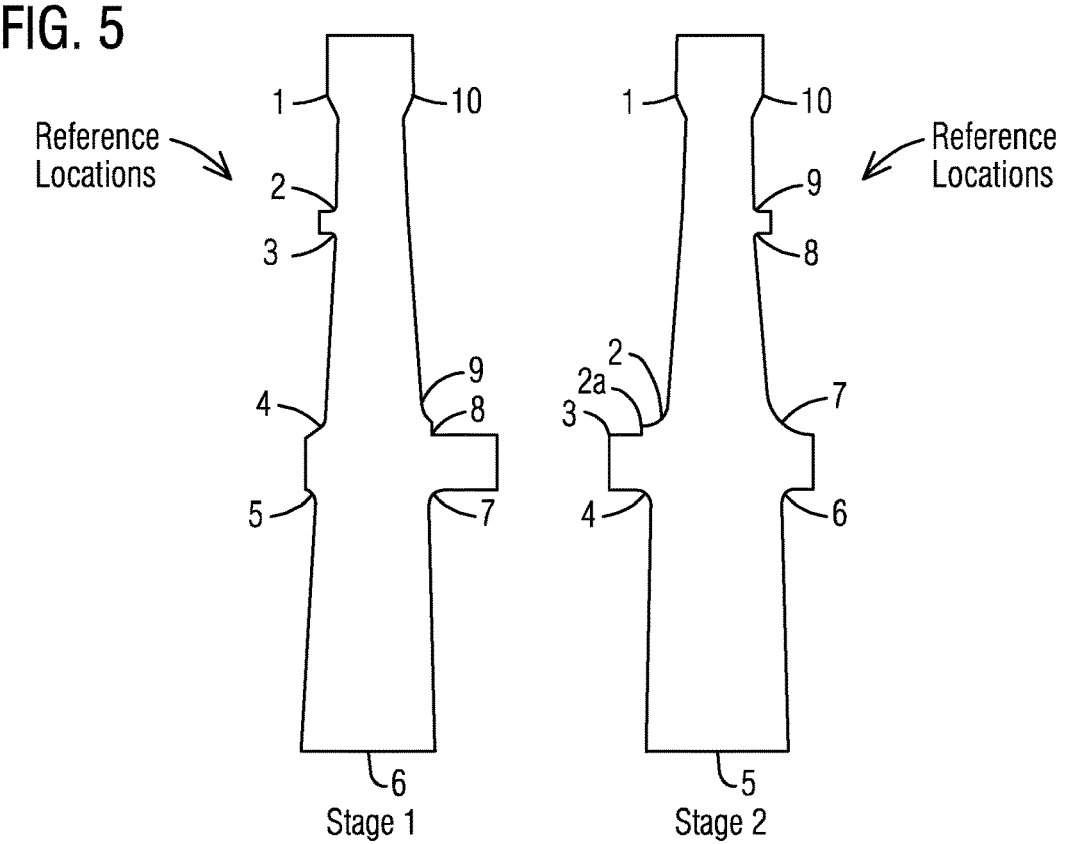
FIG. 5 depicts reference locations for disk axisymmetric features.
Figure 6:
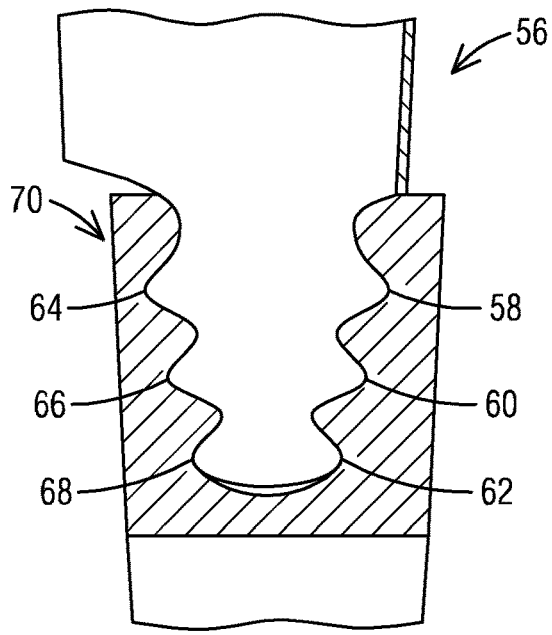
FIG. 6 depicts a cross sectional view of a root section firtree.

In accordance with aspects of the present invention, life impact studies are performed. FIGS. 5 and 6 depict reference locations for disk axisymmetric features and firtree features that are the focus of life impact studies. Referring to FIG. 5, reference locations 1-10 are designated for selected disk axisymmetric features of Stage 1 and Stage 2 disks, respectively. FIG. 6 depicts a cross sectional view of a root section firtree 56 having first 58, second 60 and third 62 lobes located within upper 64, middle 66 and lower 68 notches of a disk firtree 70. Internal finite element code is used for pre-processing, solving and post-processing. Symmetric disk features were assessed by means of two-dimensional (2D) axisymmetric models and disk firtree features 70 were assessed by using a three-dimensional (3D) sector model bladed-disk. Steady state and transient temperature profiles were interpolated from the thermal models. Since most of the units in marine oil and gas applications are operated at a baseload conditions, they do not experience a very high number of start-shutdown cycles in their lifetime. Hence, for life power turbine predictions, the damage contributions from LCF and creep are evaluated separately while the simple approach of linear accumulation of damage from LCF and creep has been used to estimate the total damage. For cyclic damage predictions, the strain vs. life data for crack initiation and fatigue crack growth data for propagation evaluation is generated from isothermal smooth specimen tests without considering the contribution of hold times in damage growth per cycle. Additionally, the assessments were performed for a known single square cycle with start-up-ramp up to sync idle-hold at idle-ramp up to steady state-hold at steady state and shutdown.

With respect to crack initiation predictions, reference is made to the previously incorporated Life Prediction document. Further, the disclosure of Corran, R. S. J. Williams, S. J (2007) "Lifing Methods and Safety Criteria in aero gas turbines", Engineering Failure Analysis 14, p. 518-528 is hereby incorporated by reference in its entirety. In particular, for crack initiation predictions, corresponding effective strains were computed using monotonic stress strain curve from the first material response cycle for a given strain range vs. life specimen test. Fitting parameters "$N_o$", "$U_N$", and "$A$" were then accordingly chosen to fit all the measured effective strains and life to failure from specimen testing. The square cycle effective strains were predicted using isotropic hardening from finite element predictions and then compared to the monotonic effective strain vs life curves from specimen tests. See previously described Eqns. (1) and (2). For simplicity in modeling and for additional conservatism in predictions, life assessment studies were performed on disk models with dimensions corresponding to repaired disks while assuming that they have been installed in-service through the operating life of the power turbine.

Table 1 lists the changes in PSCL at disk axisymmetric features for repaired disks as compared to the baseline configuration. In Table 1, Disk identification (Disk ID) and Location identification (Location ID) correspond to the disks and reference locations, respectively, shown in FIG. 5. As shown in Table 1, PSCL at the disk axisymmetric features is improved for the Stage 1 and Stage 2 disks. In particular, there is an approximately 80% improvement in the Stage 1 disk PSCL and an approximately 260% improvement in the Stage 2 disk PSCL for the repaired disks as compared to the baseline configuration with respect to known axisymmetric features that are life limiting. This improvement may be attributed to the overall reduction in state of stress due to reduction in centrifugal load attributed to the removal of metal from the disk sections that are radially outboard to the critical life limiting locations.

TABLE 1

| Disk ID | Location ID | % Change in PSCL |
|---|---|---|
| Stage 1 | 7 | 80% Increase |
| Stage 2 | 4 | 260% Increase |

Table 2 lists the changes in PSCL at disk firtree features for repaired disks as compared to the baseline configuration and changes to accumulated equivalent inelastic creep strain. In Table 2, Disk identification (Disk ID) and Location identification (Location ID) correspond to the disk and reference locations set forth in FIGS. 5 and 6, respectively.

TABLE 2

| Disk ID | Location ID | % Change in PSCL | % Change in Mean Section Creep Strain |
|---|---|---|---|
| Stage 1 | Lower Notch | 32% Decrease | 28% Increase |
| Stage 2 | Lower Notch | 57% Decrease | 27% Increase |

In this case, there is an approximately 32% reduction in the Stage 1 disk firtree PSCL and an approximately 57% reduction in the Stage 2 disk firtree PSCL for repaired disks as compared to the baseline configuration. This may be attributed to an overall reduction in the load bearing area of the firtree due to machining. Accordingly, repairs are performed on disks based on whether selected operational thresholds based on fleet experience are exceeded. Additionally, a robust in situ inspection schedule is used for effective field management of the disks that are be returned to service post repair.

Figure 7:
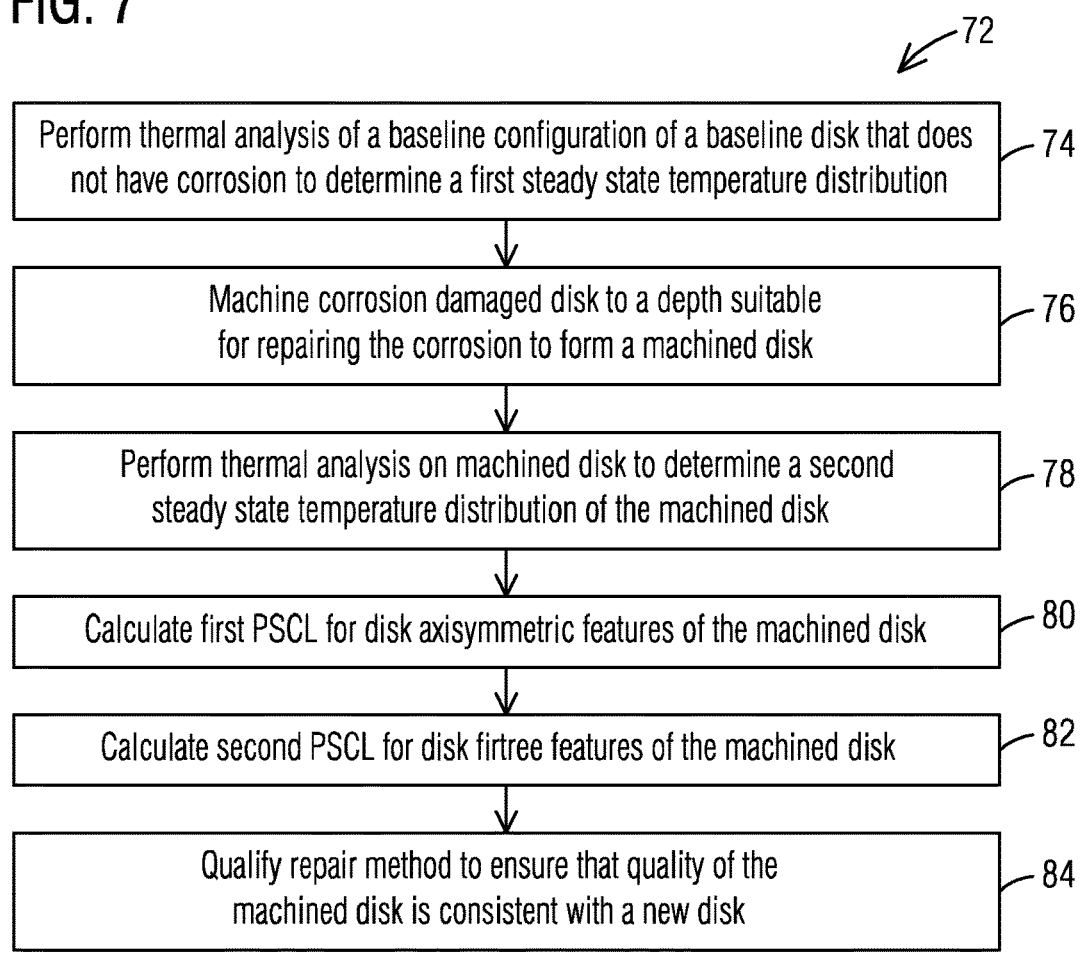
FIG. 7 depicts a repair method for extending a service life of a power turbine disk having corrosion damage.

Referring to FIG. 7, a repair method 72 for extending a service life of a power turbine disk having corrosion damage is shown. At Step 74, a thermal analysis is conducted of a baseline configuration of a baseline disk that does not have corrosion to determine a first steady state temperature distribution. At Step 76, a corrosion damaged disk is machined to a depth suitable for repairing the corrosion to form a machined disk. At Step 78, a thermal analysis is conducted on the machined disk to determine a second steady state temperature distribution of the machined disk. A first PSCL is then calculated for disk axisymmetric features of the machined disk at Step 80. Further, a second PSCL is calculated for disk firtree features of the machined disk at Step 82. At Step 84, the repair method is qualified to ensure that the quality of the machined disk is consistent with a new disk.

Machining Trials and Evaluations

Several machining trials were performed on in-service corroded disks to establish machining fixturing, process details, sequence of operations, new datum setup, inspection dimensions/gauge points. Inspection of the disks was performed after repair via fluorescent particle inspection (FPI) for remaining signs of corrosion pitting/damage. A detailed metallographic study of the specimens, which were machined from the repaired trial disks, was also performed to evaluate post repair microstructural damage, subsurface residual corrosion induced spikes/depletion zones and intergranular attack. Thereafter, extensive testing program was undertaken on the specimens machined from the important locations of repaired disks for evaluation of detriment in overall mechanical properties. Additionally, disks were also evaluated for the development of surface residual stresses at key features and locations post repair and compared with the residual stress magnitudes prior to repair. A detailed dimensional survey of the trial disks was also performed prior and post repair using 3D white light scan to quantify machining induced deformation in the profile of in service disks.

Mechanical Property and Metallographic Evaluations

White light scans were used to identify possible dimensional non-conformances in the disks that might have been induced due to distortion from the repair procedure. No signs of corrosion pitting and damage were observed on most of the disk profile. Minor residual corrosion damage remained around hard to machine features such as balance ring and firtree face. Additional machining gauge points were defined around the balance ring fillet areas for more accurate definition of the disk profile and to enable the machining of those locations. Further, no permanent deformation because of overall spring-back due to machining was observed during white light scan post repair.

Characterization of areas with residual corrosion was performed using scanning electron microscope (SEM) and X-ray elemental mapping analysis. Samples from center, web, and rim of trial disks were investigated. The samples did not show indication of intergranular corrosion, depleted matrix with sulfide particles, and titanium oxide at the scale surface (i.e., known high temperature hot corrosion or HTHC) but pitting was evident in some areas, a continuous layer of titanium sulfide, and a layer of nickel oxide at the scale surface (i.e., LTHC) and also some evidence of local depleted area of the base metal with titanium sulfide particles and nickel oxide layer at the surface (i.e. a transition mode between LTHC and HTHC). A rim sample of a trial disk only showed local pitting and the rest of the surface did not show any sign of subsurface corrosion. X-ray elemental mapping showed a continuous layer of titanium sulfide at the bottom of the pit and a thin oxide layer at the surface. This type of evidence typically demonstrates the occurrence of LTHC.

To investigate the potential changes in metallurgical and mechanical properties and compare these properties against the pertinent internal material specification for a brand new disk, metallographic, hardness, tensile, and stress rupture specimens were prepared as per related American Society for Testing and Materials (ASTM) standards: E8, E21 and E292. To assess the properties across whole profile of the repaired disk, specimens were prepared from the bore, web, and rim areas from both front and rear side of the disk. Moreover, to ensure that mechanical properties are comparable in all directions, tensile and stress rupture specimens were prepared in both radial and tangential directions at those areas. Hardness testing was performed on both faces of the disk at the aforementioned areas.

Figure 8:
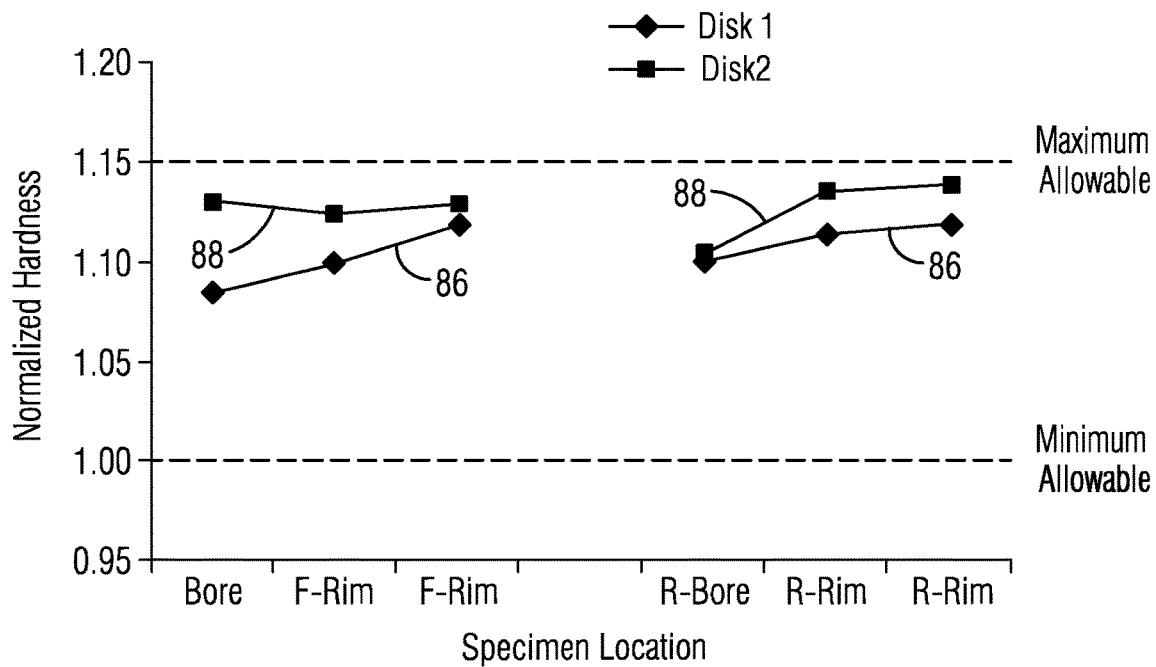
FIG. 8 shows first and second normalized hardness results for trial Disks 1 and 2, respectively.

FIG. 8 shows first 86 and second 88 normalized hardness results for Disks 1 and 2, respectively, as compared to the allowable specification range for a new disk. Disks 1 and 2 are two trial disks that were utilized for the study. In FIG. 8, "F" and "R" denote "Front face" and "Rear face", respectively. While all hardness values are within the acceptable range, a slight variation in hardness across both disks is seen that is considered to be normal due to variation in microstructure of forged disks.

Figure 9:
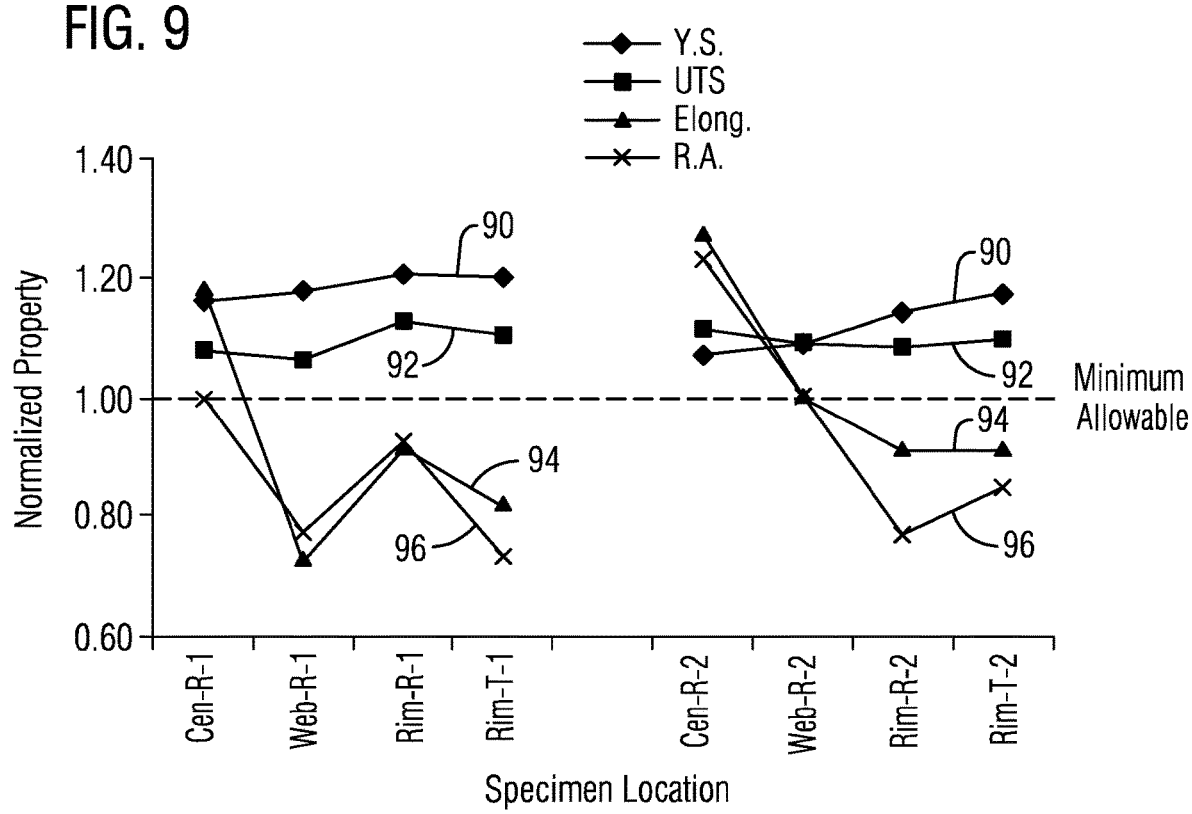
FIG. 9 shows tensile properties of repaired disks normalized to the minimum allowable specification for a new disk at room temperature.

FIG. 9 shows tensile properties of the repaired disks normalized to the minimum allowable specification for a new disk at room temperature. In FIG. 9, "Cen:" denotes "Center", "R:" denotes "Radial", and "T:" denotes "Tangential". For both disks, the yield strength (Y.S.) 90 and ultimate strength (U.T.S.) 92 of all specimens, prepared from across the whole disk and in both directions, meet the minimum requirements and show subtle variations. Elongation (Elong.) 94 and reduction in area (R.A.) 96 of both disks demonstrate a reduction in ductility from the bore toward the rim. Loss of tensile ductility observed in general can be attributed to the prolonged exposure of power turbine disks to elevated temperatures during service. It is known that coalescence or transformation of secondary hardening phases, carbide precipitation and change in type and morphology of carbides with exposure time at high temperatures, and formation of less desirable or detrimental secondary phases are among the main reasons for degradation in mechanical properties including ductility.

Figure 10:
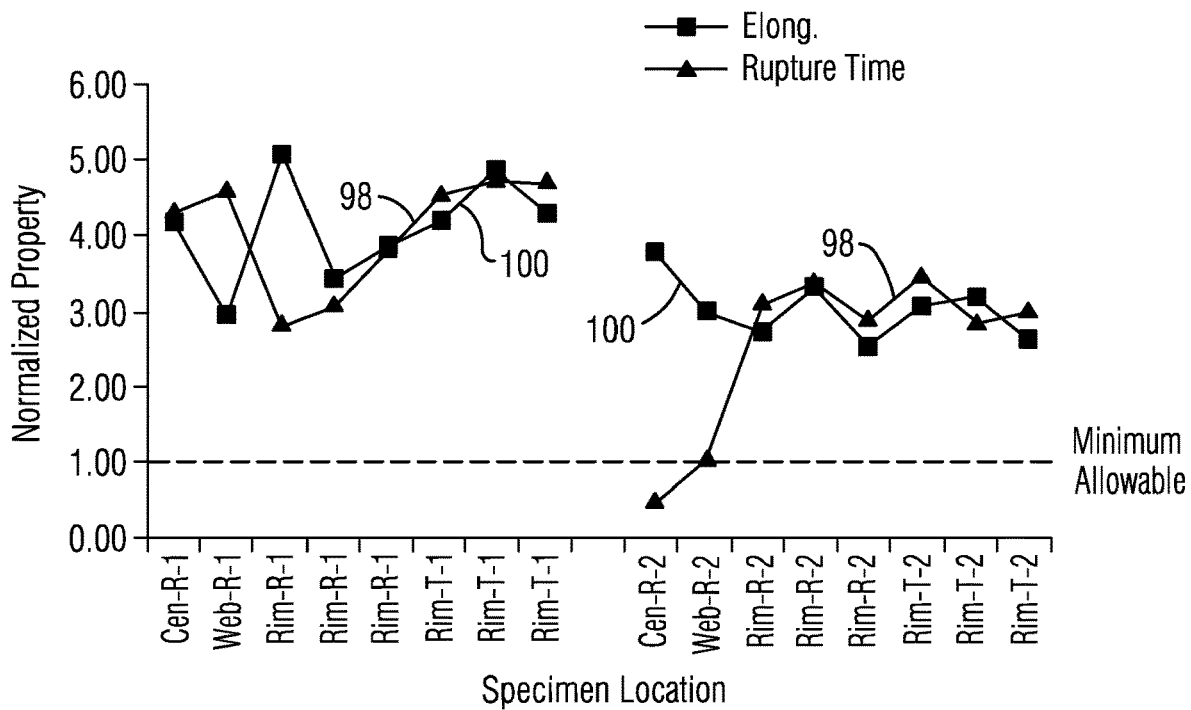
FIG. 10 depicts creep rupture properties of repaired disks normalized to the minimum allowable specification for a new disk.

FIG. 10 depicts creep rupture properties of the repaired disks normalized to the minimum allowable specification for a new disk. In particular, FIG. 10 shows the normalized rupture time (Rupture Time) 98 and elongation (Elong.) 100 in stress rupture tests performed at 649° C. (1200° F.) with a dead load of 551 MPa (approximately 80 ksi). In FIG. 10, "Cen:" denotes "Center", "R:" denotes "Radial", and "T:" denotes "Tangential". The rupture time 98 and ductility of all specimens in both disks far exceeded the minimum requirements. An anomaly from the results was rupture time 98 of the second trial disk (D2). At each of these locations the operating metal temperatures are not expected to exceed the equicohesive temperatures wherein creep becomes a concern. Additionally, the tests show a high degree of creep ductility at rupture in each of these locations. This reduction in ductility is expected for most if not for all power turbine disks in service and is not limited to the disks with observed corrosion attack.

Residual Stress Evaluations

The trial disks were evaluated for residual stresses using an X-ray diffraction technique. To compare the state of residual stress before and after repair only one face of the disk was repaired in these machining trials. The evaluation was then performed on both the repaired and the unrepaired disk face. X-ray diffraction residual stress measurements were performed using a two-angle sine-squared-psi technique, in accordance with Society of Automotive Engineers (SAE) HS-784.

Figure 11:
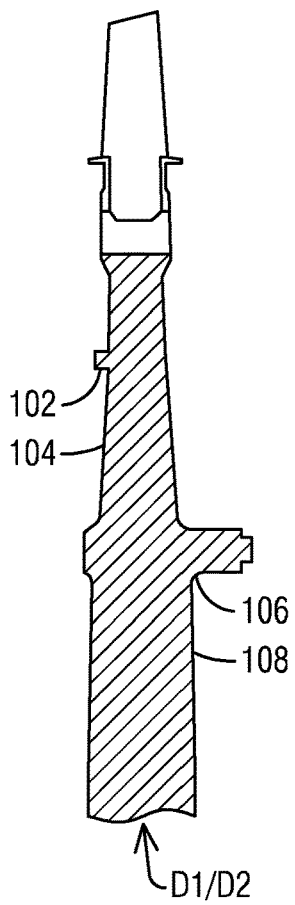
FIG. 11 shows the location of residual stress measurements at a machined notch feature and a machined web section and an unmachined notch feature and an unmachined web section of trial disks D1 and D2.

X-ray diffraction residual stress measurements were made at the surface and to predetermined nominal depths and increments of interest. Measurements were made in the radial, 45 degree, and circumferential directions at fillet radii at the balance ring on the machined face, fillet radii underneath the drive arm on unmachined face, disk web machined, and disk web unmachined locations. Referring to FIG. 11, the location of residual stress measurements at a machined notch feature 102 and a machined web section 104 and an unmachined notch feature 106 and an unmachined web section 108 of trial disks D1 and D2 is shown.

Sectioning was necessary prior to X-ray diffraction residual stress measurement in order to provide access for the incident and diffracted X-ray beams. Prior to sectioning, a single electrical resistance strain gage rosette was applied at each measurement location. The total strain relaxation, which occurred as a result of sectioning, was recorded after the sectioning process was complete. Material was removed electrolytically for subsurface measurement in order to minimize possible alteration of the subsurface residual stress distribution as a result of material removal. All data obtained as a function of depth were corrected for the effects of the penetration of the radiation employed for residual stress measurement into the subsurface stress gradient.

Figure 12:
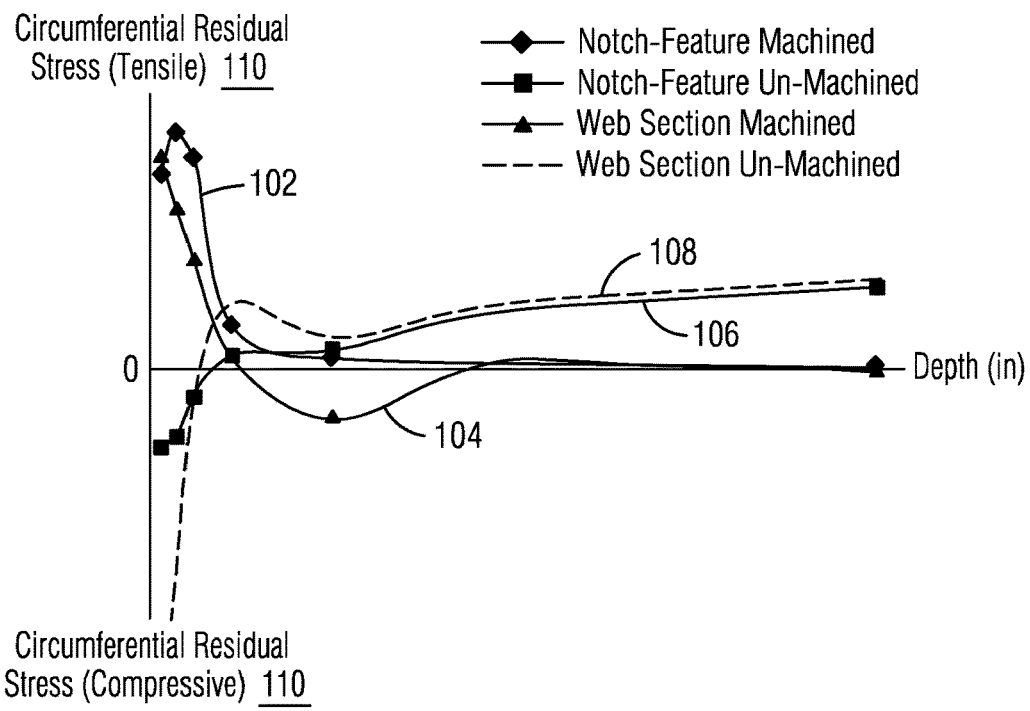
FIG. 12 illustrates residual stress measurements in a circumferential direction at the machined notch feature and machined web section and the unmachined notch feature and unmachined web section disk faces.
Figure 13:
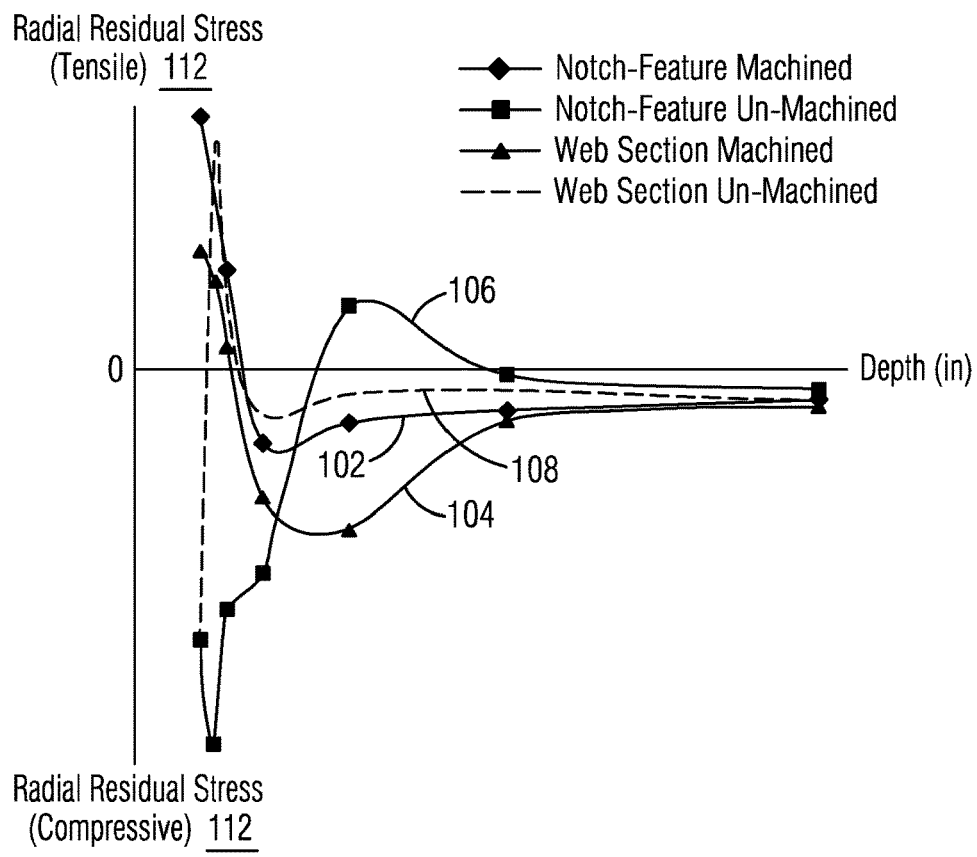
FIG. 13 illustrates residual stress measurements in a radial direction at the machined notch feature and machined web section and the unmachined notch feature and unmachined web section disk faces.

FIGS. 12 and 13 illustrate residual stress measurements in circumferential 110 and radial 112 directions, respectively, at the machined notch feature 102 and machined web section 104 and the unmachined notch feature 106 and unmachined web section 108 disk faces. As expected, residual stress measurements performed at the machined face (both notch feature 102 and web section 104) show a high magnitude of tensile residual stress on the surface. The results from the evaluation performed at the unmachined locations showed that the magnitude of the measured residual stresses is compressive in nature. These findings were especially interesting for the web section of the unmachined face which is not expected to undergo creep or plastic deformation. Hence, it was expected that for the unmachined web section 108, either residual state of stress stayed tensile from the original machining similar to what is observed on the machined face post repair or should have relaxed off as the trial disks D1 and D2 have experienced significant operating hours through their lifetime. The fact that no stress relaxation has been observed at the unmachined location shows that no subsequent creep or plastic deformation occurred at the unmachined web location as predicted.

Figure 14:
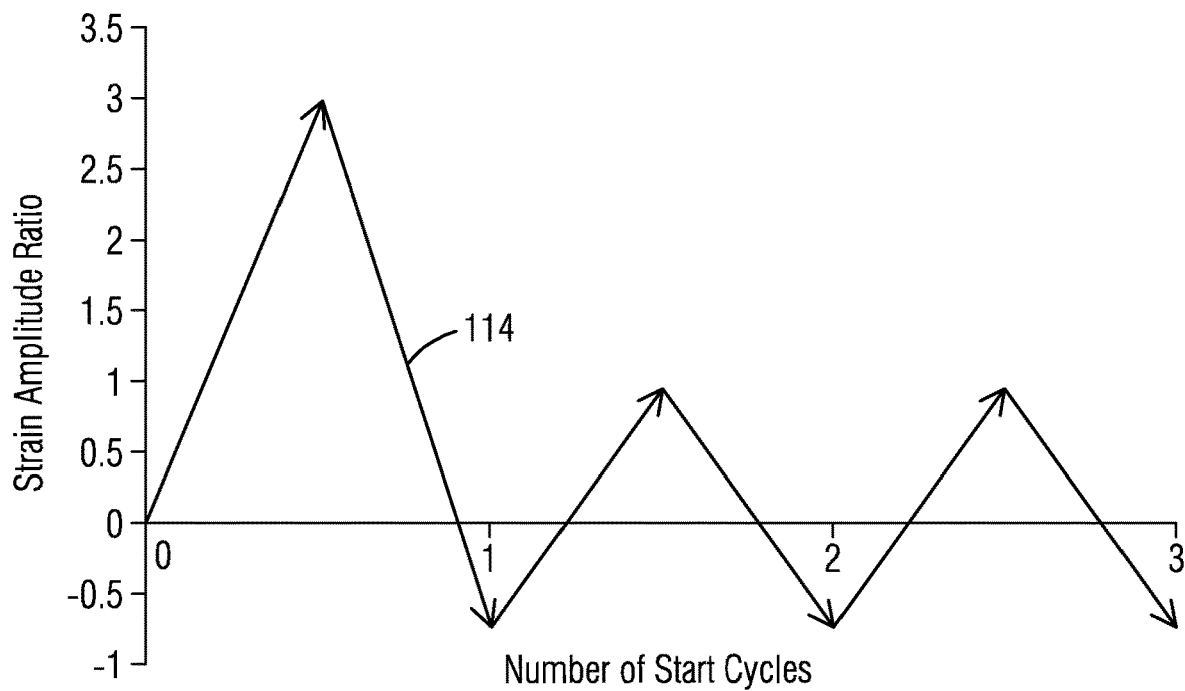
FIG. 14 depicts power turbine disk loading profile (strain amplitude per cycle) with the tensile overload loading for the first cycle due to residual stress.
Figure 15:
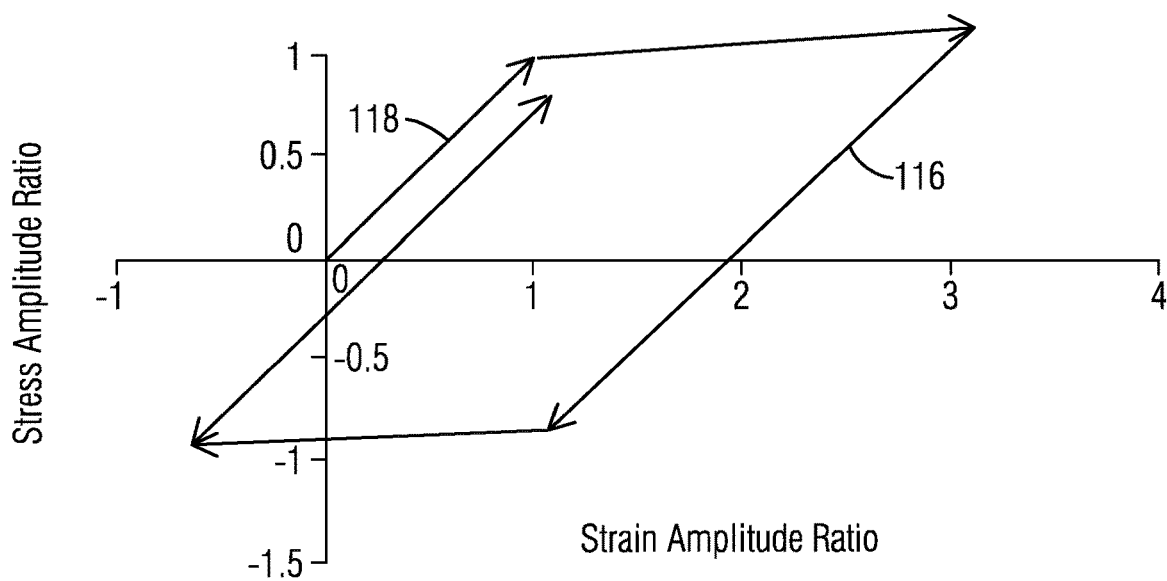
FIG. 15 depicts a response of power turbine disk due to the tensile overload loading for the first cycle due to residual stress.

FIGS. 14 and 15 provide a possible explanation of the compressive residual stress as measured in the unmachined locations of the trial disks D1 and D2. FIG. 14 depicts an power turbine disk loading profile (strain amplitude per cycle) 114 with the tensile overload loading for the first cycle due to residual stress. FIG. 15 depicts a response 116 of power turbine disk due to the tensile overload loading for the first cycle due to residual stress. Originally, the transient stress predictions did not take into account the contribution of an initial tensile residual stress through a thermal transient cycle in the overall stress state. However, in actual operation, the high tensile residual stress due to machining in addition to transient stress leads to a tensile overload/plastic deformation in the first cycle. Subsequently, the state of stress becomes compressive post shutdown due to unloading. However, post the first startup and shutdown cycle of the turbine, the state of stress cycles between tension and compression elastically through each subsequent transient cycle and stays compressive after every shutdown. Residual stress evaluation showed that high tensile residual stress induced due to repair operations resulted in overall compressive state of stress during operation after first few cycles and are therefore are actually beneficial in reducing overall stress state at the web sections.

The hysteresis 118 in FIG. 15 shows an example the response 116 of the power turbine disk to the tensile overload for the first cycle due to residual stress. Strain ratio term in the graphs is the ratio of peak strain to 0.2% offset strain while the stress ratio is the corresponding stress response amplitude to the proof stress of power turbine alloy at 0.2% offset strain. It is noted that the ratio values in the graphs are for illustration only and do not represent the magnitudes predicted for the actual components.

Thus, metallographic and X-ray spectroscopy evaluation of the specimens from the trial disks D1 and D2 showed no signs of microstructural damage, subsurface residual corrosion induced spikes/depletion zones and intergranular attack post repair. Additionally, the evaluation of mechanical properties performed on the specimens extracted from the trial disks post repair showed that the hardness, tensile, creep and ductility values met the acceptance levels specified for a brand new power turbine disk.

The invention provides complete removal of the corrosion damage on power turbine disks exposed to LTHC thus enabling life extension and safe return to service of such service corroded disks. While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A repair method for extending a service life of a power turbine disk having corrosion damage, wherein the power turbine includes stages and interstage gaps, comprising:
conducting a first thermal analysis of a baseline configuration of a baseline disk that does not have corrosion to determine a first steady state temperature distribution;
machining a corrosion damaged disk to a depth suitable for repairing the corrosion to form a machined disk;
conducting a second thermal analysis of the machined disk to determine a second steady state temperature distribution of the machined disk;
calculating a first predicted safe cyclic life (PSCL) for disk axisymmetric features of the machined disk;
calculating a second PSCL for disk firtree features of the machined disk; and
qualifying the repair method to ensure that the quality of the machined disk is consistent with a new disk.

2. The method of claim 1, wherein the depth for machining the machined disk is established statistically.

3. The method of claim 2, wherein the depth for machining the machined disk is established statistically by studying an observed depth of subsurface damage induced by Low Temperature Hot Corrosion (LTHC).

4. The method of claim 1, wherein the second thermal analysis includes a determination of steady state temperature variation between the baseline configuration and worst case interstage gaps due to machining of the machined disk.

5. The method according to claim 1, wherein the first PSCL is based on rim temperature reference points.

6. The method according to claim 1, wherein the disk firtree features include upper, middle and lower notches of the disk firtree.

7. The method according to claim 1, wherein the PSCL of a disk feature is $\frac{2}{3}^{rd}$ of a minimum life to burst.

8. A repair method for extending a service life of a power turbine disk having corrosion damage, wherein the power turbine includes stages and interstage gaps, comprising:
conducting a first thermal analysis of a baseline configuration of a baseline disk that does not have corrosion to determine a first steady state temperature distribution;
machining a corrosion damaged disk to a depth suitable for repairing the corro- sion to form a machined disk, wherein the depth for machining the disk is established statistically;
conducting a second thermal analysis of the machined disk to determine a second steady state temperature distribution of the machined disk;
calculating a first predicted safe cyclic life (PSCL) for disk axisymmetric features of the machined disk;
calculating a second PSCL for disk firtree features of the machined disk; and
qualifying the repair method to ensure that the quality of the machined disk is consistent with a new disk.

9. The method of claim 8, wherein the depth for machining the machined disk is established statistically by studying an observed depth of subsurface damage induced by Low Temperature Hot Corrosion (LTHC).

10. The method of claim 8, wherein the second thermal analysis includes a determination of steady state temperature variation between the baseline configuration and interstage gaps due to machining of the machined disk.

11. The method according to claim 8, wherein the first PSCL is based on rim temperature reference points.

12. The method according to claim 8, wherein the disk firtree features include upper, middle and lower notches of the disk firtree.

13. The method according to claim 8, wherein the PSCL of a disk feature is $\frac{2}{3}^{rd}$ of a minimum life to burst.

14. A repair method for extending a service life of a power turbine disk having corrosion damage, wherein the power turbine includes stages and interstage gaps, comprising:
conducting a first thermal analysis of a baseline configuration of a baseline disk that does not have corrosion to determine a first steady state temperature distribution;
machining a corrosion damaged disk to a depth suitable for repairing the corrosion to form a machined disk, wherein the depth for machining the disk is established statistically;
conducting a second thermal analysis of the machined disk to determine a second steady state temperature distribution of the machined disk;
calculating a first predicted safe cyclic life (PSCL) for disk axisymmetric features of the machined disk;
calculating a second PSCL for disk firtree features of the machined disk; and
qualifying the repair method to ensure that the quality of the machined disk is consistent with a new disk, wherein qualifying the repair method includes machining trials, mechanical property and metallographic evaluations and residual stress evaluations.

15. The method of claim 14, wherein the depth for machining the machined disk is established statistically by studying an observed depth of subsurface damage induced by Low Temperature Hot Corrosion (LTHC).

16. The method of claim 14, wherein the second thermal analysis includes a determination of steady state temperature variation between the baseline configuration and interstage gaps due to machining of the machined disk.

17. The method according to claim 14, wherein the first PSCL is based on rim temperature reference points.

18. The method according to claim 14, wherein the disk firtree features include upper, middle and lower notches of the disk firtree.

19. The method according to claim 14, wherein the PSCL of a disk feature is $\frac{2}{3}^{rd}$ of a minimum life to burst.

20. The method according to claim 14, wherein damage contributions from low cycle fatigue (LCF) and creep are evaluated separately.

* * * * *